United States Patent
Laimboeck et al.

(10) Patent No.: US 9,383,014 B2
(45) Date of Patent: Jul. 5, 2016

(54) METHOD FOR MILLING A CYLINDER HEAD AND CYLINDER HEAD

(71) Applicant: MAHLE KÖNIG KOMMANDITGESELLSCHAFT GMBH & CO. KG, Rankweil (AT)

(72) Inventors: Franz Laimboeck, Goleta, CA (US); Siegfried Lins, Feldkirch Altenstadt (AT)

(73) Assignee: MAHLE Koenig Kommanditgesellschaft GmbH & Co. KG, Rankweil (AT)

( * ) Notice: Subject to any disclaimer, the term of this patent is extended or adjusted under 35 U.S.C. 154(b) by 725 days.

(21) Appl. No.: 13/721,378

(22) Filed: Dec. 20, 2012

(65) Prior Publication Data

US 2013/0152781 A1 Jun. 20, 2013

Related U.S. Application Data

(60) Provisional application No. 61/577,976, filed on Dec. 20, 2011.

(51) Int. Cl.
| | |
|---|---|
| *B23P 11/00* | (2006.01) |
| *F16J 10/02* | (2006.01) |
| *B23Q 9/00* | (2006.01) |
| *B23C 3/00* | (2006.01) |
| *B23C 3/34* | (2006.01) |

(52) U.S. Cl.
CPC . *F16J 10/02* (2013.01); *B23C 3/00* (2013.01); *B23C 3/34* (2013.01); *B23Q 9/00* (2013.01); *B23C 2215/08* (2013.01); *B23C 2215/24* (2013.01); *B23C 2220/32* (2013.01); *B23C 2220/36* (2013.01); *B23C 2220/48* (2013.01); *B23C 2270/16* (2013.01); *Y10T 409/303752* (2015.01)

(58) Field of Classification Search
CPC .............. F16J 10/02; B23C 3/00; B23C 3/34; B23C 9/00
USPC .......................................... 29/888.06; 92/164
See application file for complete search history.

(56) References Cited

PUBLICATIONS

OverlandExpress, Anyone ever head of dimpling your aluminum intake manifold?, Ford Truck Enthusiasts, Oct. 10, 2010 12:33 AM, can be found at <http://www.ford-trucks.com/forums/999832-anyone-ever-hear-of-dimpling-your-aluminum-intake-manifold.html>.*
CNCKeith, 5 Axis CNC Culinder Head Porting Centroid CNC. Hi res version with Digitizing. Uploaded Sep. 18, 2009, can be found at <https://www.youtube.com/watch?v=kcERvWYUNUw>.*

\* cited by examiner

*Primary Examiner* — Nathaniel Wiehe
*Assistant Examiner* — Daniel Collins
(74) *Attorney, Agent, or Firm* — Laurence A. Greenberg; Werner H. Stemer; Ralph E. Locher

(57) ABSTRACT

A method for the machine-milling of intake and/or exhaust ducts formed in a cylinder head includes working off the inner wall surfaces of the intake and/or exhaust ducts at least in part, preferably completely, with a multi-axis, preferably five-axis, CNC-controlled cherry head in a stabbing movement. Grooves are thus formed in the inner wall surfaces that extend primarily in the flow direction of the ducts.

18 Claims, 7 Drawing Sheets

METHOD FOR MILLING A CYLINDER HEAD AND CYLINDER HEAD

CROSS-REFERENCE TO RELATED APPLICATION

This application claims the benefit, under 35 U.S.C. §119 (e), of provisional patent application No. 61/577,976 filed Dec. 20, 2011; the prior application is herewith incorporated by reference in its entirety.

BACKGROUND OF THE INVENTION

Field of the Invention

The invention relates to a method for the machine-milling of intake and/or exhaust ducts formed in a cylinder head and to a cylinder head with machine-milled intake and/or exhaust ducts.

It is known to machine cylinder heads by milling, for which purpose the walls are milled off in a direction of movement that extends in a circle around the respective longitudinal axis of the machined component, e.g. the interior of a cylinder, or the interior of an intake duct or exhaust duct.

SUMMARY OF THE INVENTION

The object of the invention is, on the one hand, to simplify the production of cylinder heads and, on the other hand, as a result of the machining method used, to ensure that the flow conditions in the ducts are not impaired, as is the case when milled channels are formed in the circumferential direction of gas-carrying cavities in cylinder heads or engine blocks.

According to the invention, these objects are achieved, in a method of the aforementioned type, by virtue of the fact that the wall surfaces of the intake and/or exhaust ducts are worked off at least in part, preferably completely, with a multi-axis, preferably five-axis, CNC-controlled cherry head in a stabbing movement, and grooves are thus formed in the wall surfaces. This procedure makes it possible to machine the longitudinally curved wall surface of intake ducts and/or exhaust ducts in a stabbing movement, without having to modify the clamping of the cylinder heads in the milling tool during the machining method. Moreover, it is also possible to machine a plurality of cylinder heads simultaneously, each with a long-shank cherry head that can be adjusted multi-axially and in a controlled manner in corresponding spatial directions and performs the machining of the wall surfaces of the ducts. Moreover, by means of the grooves obtained by this stabbing movement, which grooves, with small exceptions, e.g. in the area of the valve seats, extend in the longitudinal direction or through-flow direction of the ducts, it is possible to ensure that ω-shaped secondary flows are reduced in the channel halves separated by a schematic longitudinal center plane AB, particularly in curved duct regions, as a result of which the flow behavior in the ducts is improved. The disadvantageous effect of flows of this kind that continue from the ducts into the combustion chamber has hitherto not been taken into consideration and could now be considerably reduced by the design and arrangement of the grooves.

Advantageously, the entire length or inner wall surface of the ducts is worked off in a stabbing movement of the cherry head and provided with grooves.

It is advantageous if it is not only the inner wall surfaces of the ducts that are machined in this manner and instead, in addition to the inner wall surfaces of the intake and/or exhaust ducts, it is also the combustion chamber wall and/or the walls of valve seat rings fitted, in particular pressed, into the ducts and/or the outer wall surfaces of valve guides protruding into the ducts that are worked off at least in part, preferably completely, with a multi-axis, preferably five-axis, CNC-controlled cherry head in a stabbing movement, and grooves are thus formed in the walls. In this way, in addition to simplified machining, it is also ensured that undesired secondary flows are reduced or avoided along these walls. The sealing or contact surfaces of the valve seat rings are of course not subject to surface machining of this kind.

Depending on the nature of the ducts, their diameter and length and curvature, suitably dimensioned spherical cutters are used, advantageously long-shank cherry heads.

In the machining of the wall surfaces, the procedure followed is one in which the cherry head is guided across the inner wall surfaces, or the other wall surfaces, or the walls to be machined, in paths extending alongside each other in the form of similar groups of curves, preferably in mutually parallel and/or directly adjacent or overlapping paths, with grooves being formed along these paths.

It has proven advantageous if, in the course of the machining with stabbing movements, grooves are formed which are milled into the ducts and are oriented in the longitudinal direction or through-flow direction of these ducts.

In order to be able to effectively suppress circular flows, provision is made that the grooves are worked out with a depth of 0.05 to 0.4 mm, preferably of 0.1 to 0.15 mm, and/or are formed at mutual intervals of 1 to 5 mm, in particular of 1 to 3 mm.

Furthermore, the through-flow behavior of the gases flowing through the ducts can be improved if, in the wall surface of the ducts, in particular of the intake duct, provided with grooves, a cherry head is used to mill depressions which have a spherical surface shape and which are advantageously uniformly distributed or at least are at identical intervals to one another across a large part of the inner wall surface. Such depressions can also be produced with a cherry head, in particular a long-shank cherry head.

A cylinder head according to the invention, of the aforementioned type, is characterized in that at least part of the wall surface, preferably the entire wall surface, of the intake and/or exhaust ducts is machined with a cherry head guided in a stabbing movement, wherein at least some, preferably all, of the grooves that are thus worked out extend alongside each other in the form of similar groups of curves, if appropriate parallel to each other and/or directly adjacent to each other or overlapping each other, in the through-flow direction or longitudinal direction of the ducts.

It is advantageous if, in addition to the inner wall surfaces of the ducts, it is also the combustion chamber wall and/or the wall surfaces of valve guides fitted or pressed into the ducts and/or of valve seat rings fitted or pressed into the ducts that are machined with a cherry head guided in a stabbing movement, wherein at least some, preferably all, of the grooves that are worked out extend parallel to each other.

It is effective if the depth of the grooves that are worked out measures 0.05 to 0.4 mm, preferably 0.1 to 0.15 mm, and/or the mutual interval between the grooves measures 1 to 5 mm, in particular of 1 to 3 mm and/or if depressions having a spherical wall surface are milled into the inner wall surfaces of the ducts, preferably of the intake duct, in particular at predetermined and preferably regular intervals from each other.

Flow is promoted if, in at least one intake duct, a valve guide is fitted whose duct-side end region is worked off or milled off flush with the wall surface of the duct.

In another embodiment of the invention, provision can be made that, in at least one exhaust duct, a valve guide is fitted whose duct-side end region adjoins a combustion-chamber-side flow body which, on the combustion-chamber-side, is worked off or milled off flush with the inner wall surface and which is adjoined, in its lateral region and/or in its region directed away from the combustion chamber, by a flow body which protrudes into the exhaust duct and whose cross section decreases, in a manner promoting flow, toward the end region directed away from the combustion chamber and merges into the inner wall surface. In this way, the valve guide regions on the duct side are shaped in a manner that promotes flow.

Other features which are considered as characteristic for the invention are set forth in the appended claims.

Although the invention is illustrated and described herein as embodied in a method for milling a cylinder head and cylinder head, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
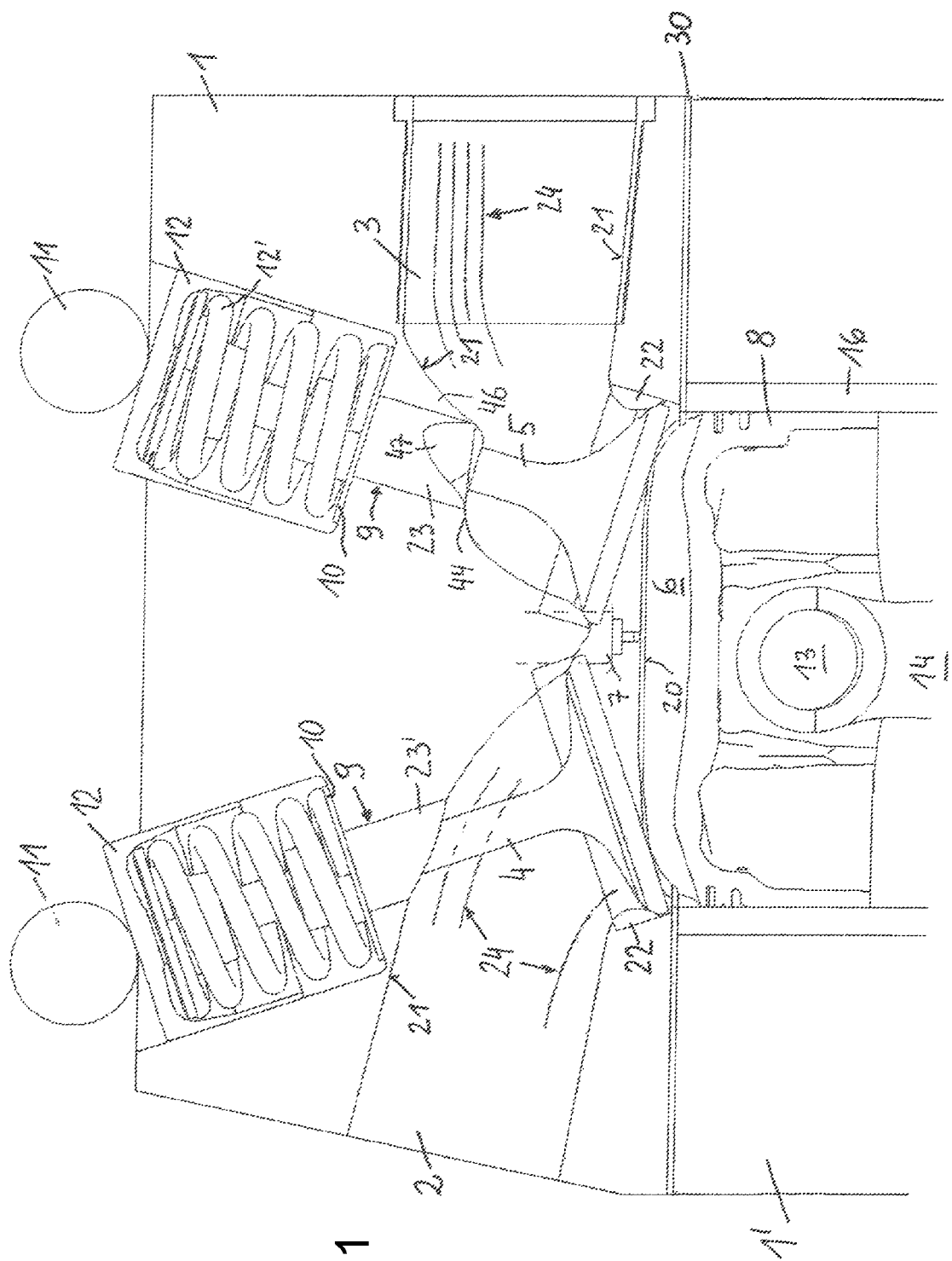
FIG. 1 shows a schematic cross section through an engine block with cylinder head, wherein the engine block and the cylinder head are indicated only schematically by contour lines. The ducts formed and the components present in the engine block or cylinder head are shown at least in part.

Referring now to the figures of the drawing in detail and first, particularly, to FIG. 1 thereof, there is shown a schematic representation of a cylinder head 1, which is mounted on a schematically represented engine block 1'. The division between the cylinder head 1 and the engine block 1' is indicated by 30.

A cylinder 16 is received in the engine block 1', in which cylinder 16 there is arranged a piston 8 that is connected to a crankshaft (not shown) via a piston pin 13 and a connecting rod 14. The end of the cylinder 16 is formed by the combustion chamber wall 20, which is formed in the cylinder head 1 and delimits the combustion chamber 6. Ducts 2, 3 formed in the cylinder head 1 open into this combustion chamber 6, an intake duct being designated by 2 and an exhaust duct by 3. The intake duct 2 can be closed by a valve 4, and the exhaust duct 3 by a valve 5. A spark plug 7 lies between the valves 4, 5. The valves 4, 5 are guided in valve guides 9. The valve guides 9 carry valve spring supports 10 for valve springs 12', which are arranged in bucket tappets 12, wherein the bucket tappets 12 are actuated by a cam shaft 11 (indicated only schematically). The end portion 23' of the valve guide 9 in the intake duct 2 finishes flush with the wall surface 21 of the duct 2, whereas in the exhaust duct, for technical reasons relating to valve cooling, the end portion 23 of the valve guide 9 protrudes into the exhaust duct 3 and, for this reason, is shaped so as to promote flow. The valve guides 9 that protrude into the intake duct 2 are worked off and are adapted to the wall surface 21 of the duct 2 and thereby shaped to promote flow.

In the intake duct 2 and in the exhaust duct 3, grooves 24 are indicated which have been left behind from the machining by a cherry head 17 or have been formed with this cherry head 17. This cherry head 17 is guided in a stabbing movement in the longitudinal direction of the respective duct 2, 3 or along the through-flow direction A and, depending on its head diameter, forms, in the inner surface 21 of the respective duct 2, 3, groove-shaped depressions or grooves 24 that provide a predetermined surface structure of the inner wall surface 21.

Advantageously, the entire inner wall surface 21 of the ducts 2, 3 is provided with grooves 24.

Figure 2:
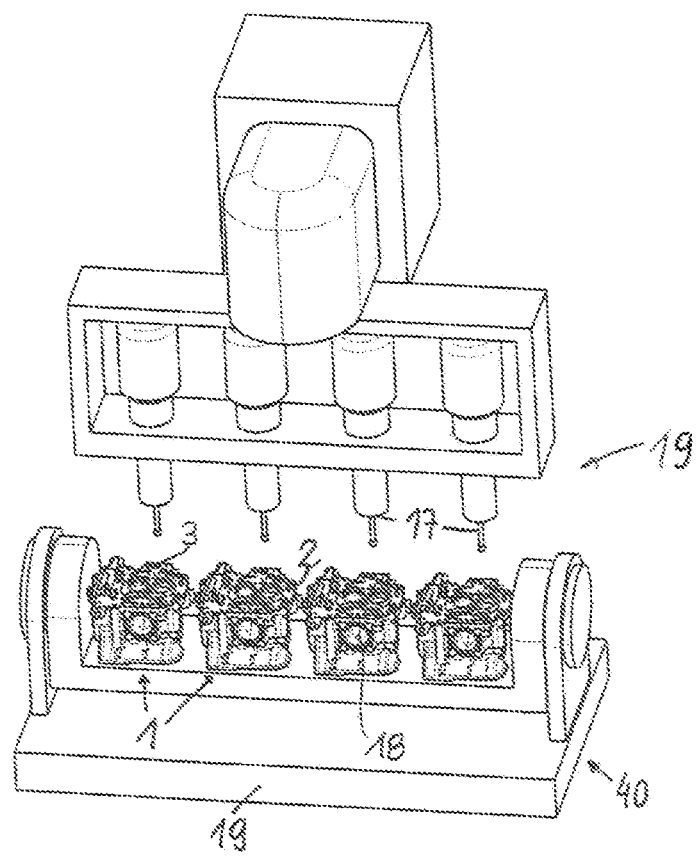
FIG. 2 shows a schematic view of the simultaneous machining of four cylinder heads with long-shank cherry heads in a milling machine.

FIG. 2 shows a machining apparatus 19 for simultaneous machining of four cylinder heads 1. The cylinder heads 1 are clamped in a swivel table 40 of this machining apparatus 19, formed by a CNC-controlled milling machine, and are machined by long-shank cherry heads 17, which can be moved in a controlled manner in multiple axes, preferably at least five axes. Thus, a number of cylinder heads 1, in the present case four cylinder heads 1, are clamped on the swivel table 40 of the CNC milling machine, and these four cylinder heads 1 are machined in parallel. As can also be seen from FIGS. 3 and 4, the long-shank cherry heads 17 are inserted through the combustion-chamber-side openings or combustion-chamber-remote openings 18 of the ducts 2, 3 and are used to machine the wall surfaces 21 of the ducts 2, 3. The movements of the swivel table 40 of the machining apparatus 19 that are required for the machining are predetermined by an electronic CNC control unit.

Figure 3:
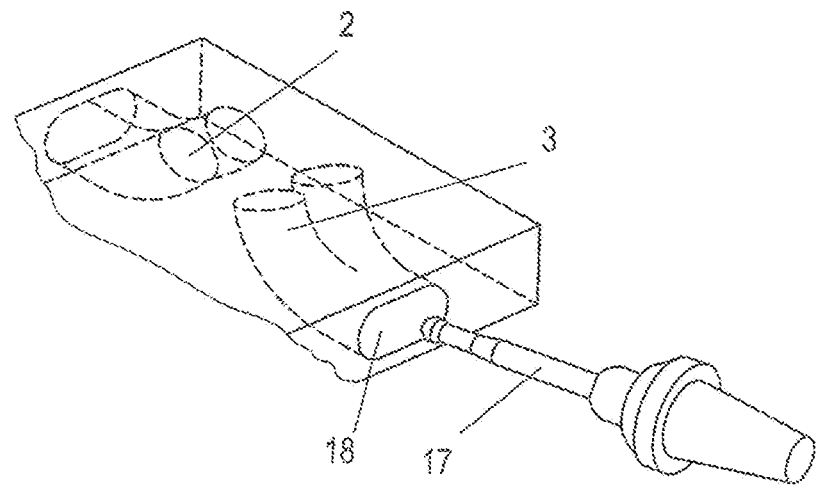
FIG. 3 shows the insertion of a long-shank cherry head into a duct, or the possibility of machining the entire wall surface of the ducts from the direction of the duct openings.

The access to the ducts 2, 3 during the stabbing-type CNC machining is from the direction of the combustion-chamber-side openings of the ducts 2, 3 and from the inflow or exhaust openings 18 formed in the cylinder head 1. In FIG. 2, cylinder heads 1 are machined that each have two intake ducts 2 and two exhaust ducts 3. FIG. 3 shows how the long-shank cherry head 17 is inserted into the outflow opening 18 of the two exhaust ducts 3 to permit the stabbing-type machining of these ducts and form grooves 24 in the inner wall surfaces 21.

Figure 4:
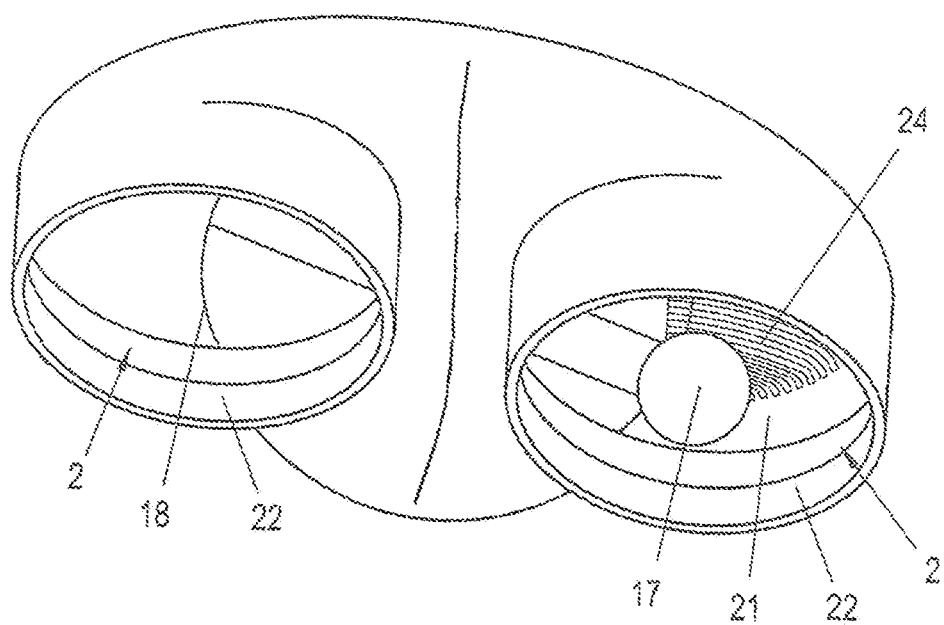
FIG. 4 shows a pair of intake ducts, which are jointly supplied from a fresh-gas admission opening whose inner wall surface is machined with a long-shank cherry head.

FIG. 4 indicates schematically the paths of the long-shank cherry head 17 and the grooves 24 formed with this milling head 17, which grooves 24 are formed in the inner wall surfaces 21. Moreover, in the end regions of the respective ducts 2, 3, valve seat rings 22 can be seen which are fitted, advantageously pressed in, and which, except for their sealing surface, are likewise machined by the inserted long-shank cherry head 17. Here too, for the sake of clarity, the grooves 24 are shown only schematically or only in part regions of the inner wall surface.

Figure 5:
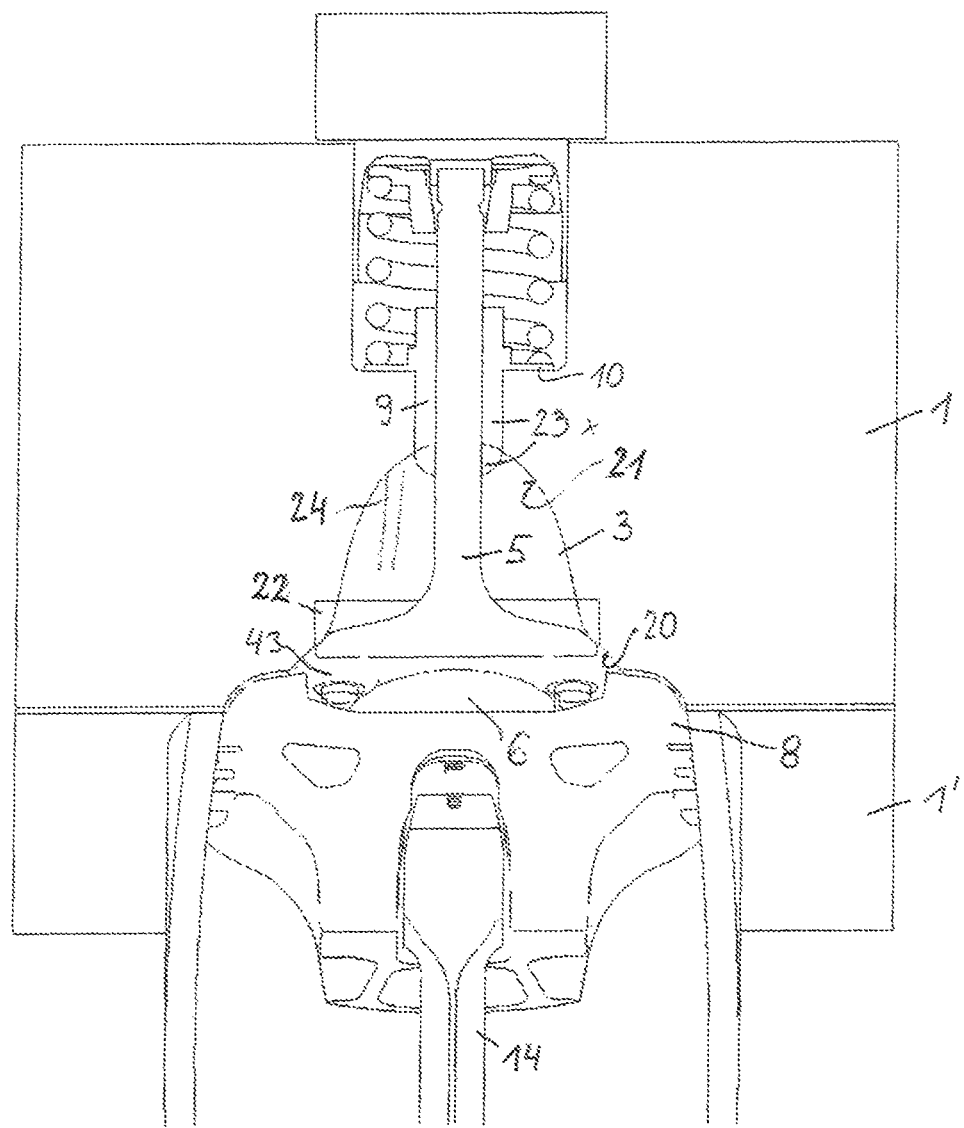
FIG. 5 shows a cross section along the mid-line of a valve arranged in the exhaust duct, wherein, below the valve, a piston is arranged in the cylinder space formed in the engine block.

FIGS. 1 and 5 show a schematic cross section through a valve 5, which is fitted in an exhaust duct 3 and which is mounted so as to move up and down in a valve guide 9. The duct 3 and the combustion chamber 6 are formed or worked from the solid cylinder head 1 and are provided with grooves 24 on their wall surfaces 21. The valve guide 9 is inserted in a bore or recess of the cylinder head 1 and protrudes into the hollow of the exhaust duct 3 formed in the cylinder head 1. The valve seat ring 22 shown is inserted into the solid cylinder head 1 and forms the contact surfaces for the head of the valve 5.

Figure 5A:
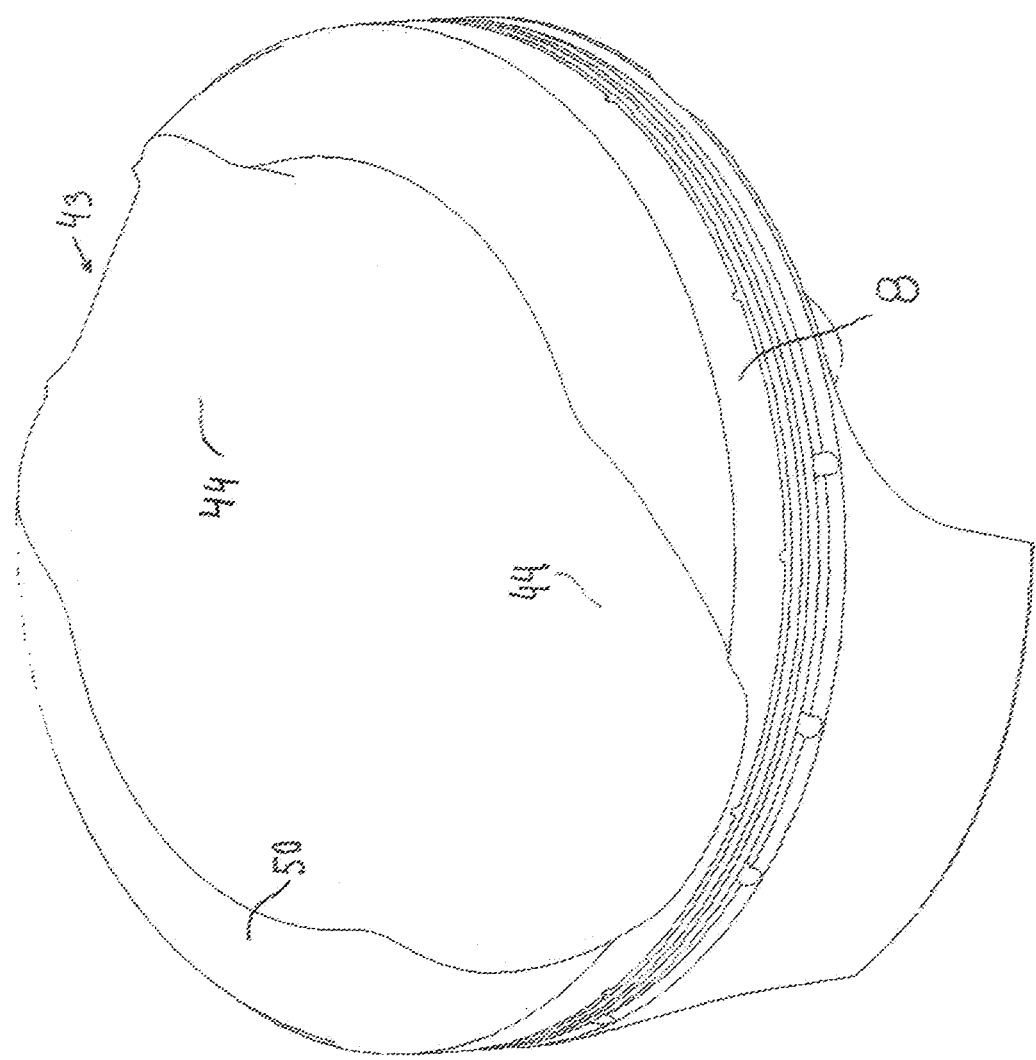
FIG. 5a shows a piston crown with laterally raised squish surfaces.

As is shown in FIGS. 5 and 5*a*, valve pockets 43 or depressions 44 for the valve movements are cut out in the piston crown. The depressions 44 are delimited by laterally raised squish surfaces or projections 50, which allow high compression to be achieved. In the region of the squish surfaces 50, the shape of the combustion chamber wall 20 and the piston crown are adapted to each other and have a constant interval at least over a large part of this region, which interval is between 0.7 and 1.0 mm.

Figure 6:
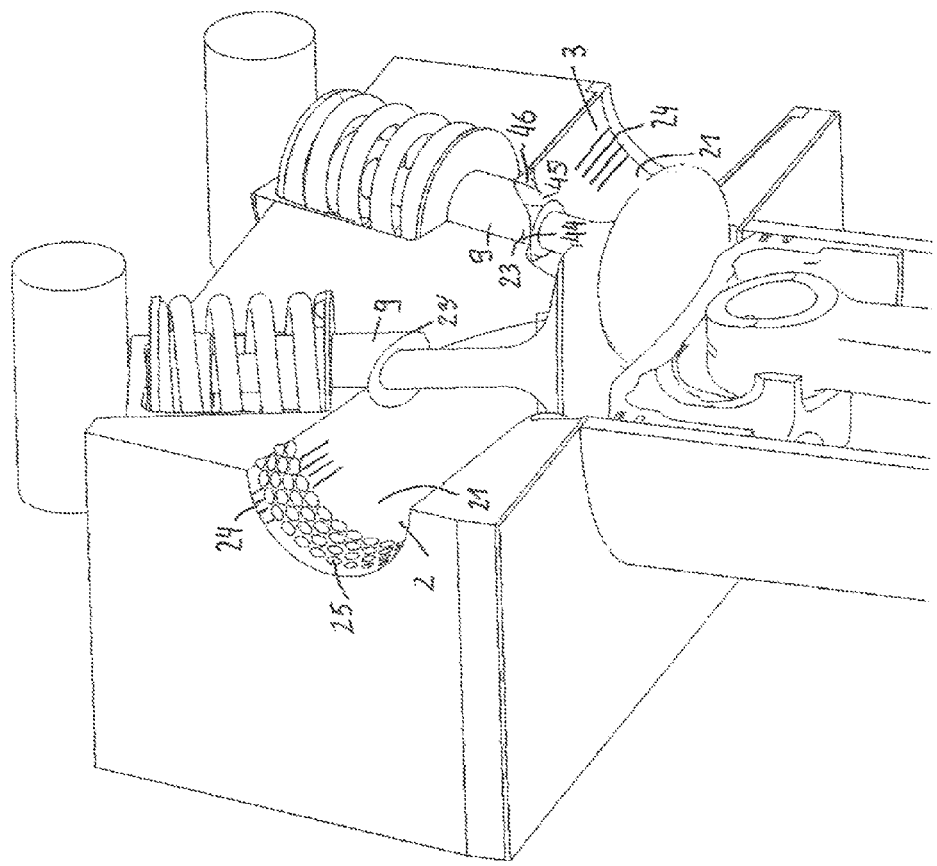
FIG. 6 shows an oblique view of valve guides with valves opening into the ducts.

FIG. 6 shows a schematic cross section through the ducts 2, 3, in which valve guides 9 are inserted. FIGS. 1 and 6 show an end portion 23' of the valve guide 9 in the intake duct 2, which end portion 23' finishes flush with the inner wall 21.

Figure 6A:
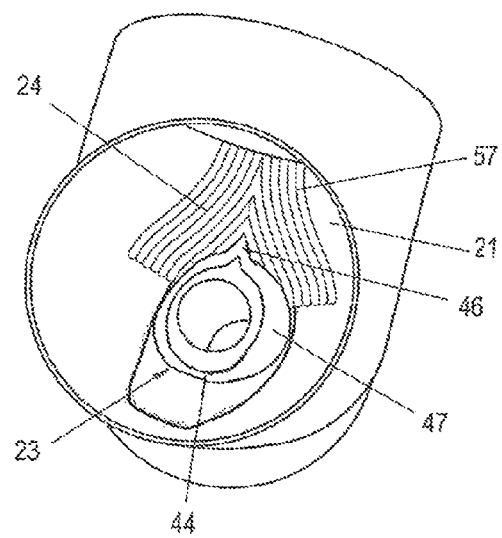
FIG. 6a shows the profile of an end section of a valve guide protruding into an exhaust duct.

In the exhaust duct 3, a portion of a flow body 44, which is rounded in order to promote flow, guides the inner wall surface 21 to the end surface of the end region 23 of the valve guide 9. In the lateral region 47, the valve guide 9 is narrowed or removed, as is shown in FIG. 6*a*, wherein the end portion 23 of the valve guide 9 is beveled off or tapers on both sides in order to achieve a continuous transition of the valve guide 9 to the wall surface 21. In the portion remote from the combustion chamber, it is adjoined by a flow body 46, which rises from the inner wall surface 21 of the duct 2 and lengthens the narrowing lateral regions 47 of the valve guide 9 so as to promote flow, and of which the height and width decrease with increasing distance from the combustion chamber, and which merges into the inner wall surface 21. Reference number 24 indicates the grooves 24 formed in the curve of the duct 3 and in the region of the flow body 46.

Figure 7:
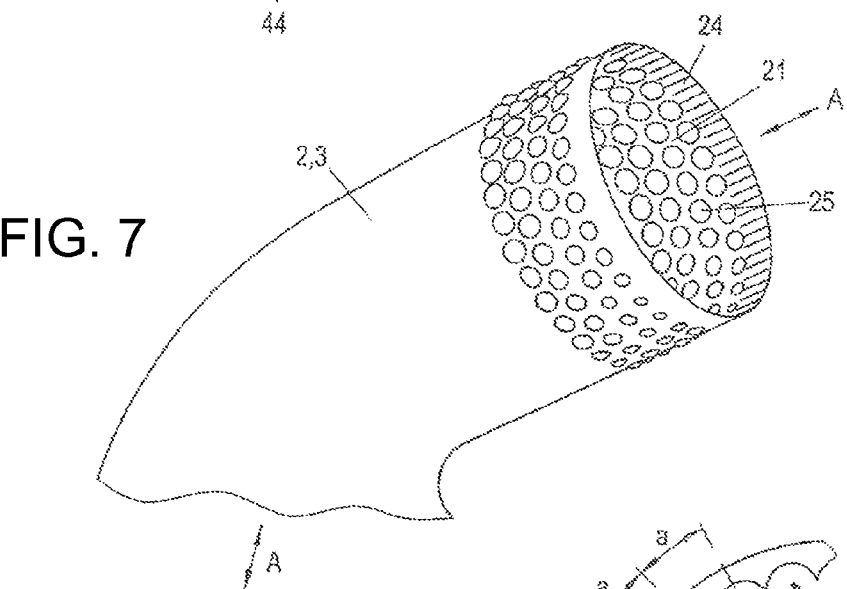
FIG. 7 shows a schematic view of a duct where, in addition to the grooves, milled depressions are formed on the wall surface.

FIG. 7 shows an advantageous development of the inner wall surface 21 of the ducts 2, 3. Depressions 25 having a spherical surface shape are hollowed out which, particularly at regular mutual intervals, are formed in the inner wall surfaces 21 of the ducts 2, 3, preferably in the intake duct 2. These depressions 25 can be produced in addition to the grooves 24 and, in their entirety, form a surface structure like a golf ball with dimples.

Figure 7A:
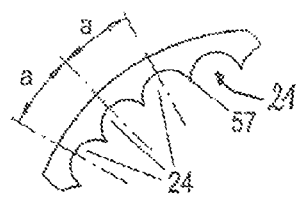
FIG. 7a shows a cross section perpendicular to the profile of grooves formed.

FIG. 7*a* shows schematically the inner wall surface 21 of a duct 2 or 3, in which grooves 24 are formed. Such a duct 2, 3 is worked out in the cylinder head 1 or hollowed out therein. In the present FIG. 7*a*, however, an outer circumferential surface has been shown in order to indicate a duct. The grooves 24 lie at mutual intervals a and adjoin each other with tips 57. In the region of the valve guides 9, the direction of the grooves 24 can deviate from the through-flow direction A of the respective duct 2, 3.

Figure 8:
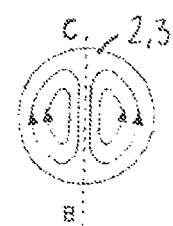
FIG. 8 shows a duct cross-section, with schematically plotted secondary flows.

The grooves 24 avoid or reduce ω-shaped secondary flows, shown in FIG. 8, in the duct halves separated by a schematic longitudinal center plane BC. This effect of the grooves 24 can be supported by the form of the depressions 25.

The invention claimed is:

1. A method for machine-milling an intake duct and/or an exhaust duct formed in a cylinder head, to the method which comprises:
    working off at least in part, and preferably completely, the inner wall surfaces of the intake and/or exhaust ducts, with a multi-axis CNC-controlled cherry head in a stabbing movement, and thus forming grooves in the inner wall surfaces; and
    in the course of the machining with stabbing movements in the inner wall surfaces, forming grooves which are milled into the ducts and are oriented in the longitudinal direction or through-flow direction of these ducts.

2. The method according to claim 1, wherein, in addition to the inner wall surfaces of the intake and/or exhaust ducts, it is also the combustion chamber wall and/or the walls of valve seat rings fitted into the ducts and/or the outer wall surfaces of valve guides protruding into the ducts that are worked off at least in part with a multi-axis CNC-controlled cherry head in a stabbing movement, and grooves are thus formed in the walls.

3. The method according to claim 1, wherein the working-off is carried out with a long-shank cherry head.

4. The method according to claim 1, wherein the cherry head is guided across the inner wall surfaces, or the other wall surfaces, or the walls to be machined, in paths extending alongside each other in the form of similar groups of curves, with grooves being formed along these paths.

5. A method for machine-milling an intake duct and/or an exhaust duct formed in a cylinder head, the method which comprises:
    working off at least in part, and preferably completely, the inner wall surfaces of the intake and/or exhaust ducts, with a multi-axis CNC-controlled cherry head in a stabbing movement, and thus forming grooves in the inner wall surfaces; and
    wherein the grooves are worked out with a depth of 0.05 to 0.4 mm, and/or are formed at mutual intervals of 1 to 5 mm.

6. The method according to claim 1, wherein, in the wall surface of the ducts, in particular of the intake duct, provided with grooves, a cherry head is used to mill depressions which have a spherical surface shape and which are advantageously uniformly distributed or at least are at identical intervals to one another across a large part of the inner wall surface.

7. A cylinder head, comprising:
    machine-milled intake ducts and/or an exhaust ducts wherein at least part of the wall surface of the intake and/or exhaust ducts is machined with a cherry head guided in a stabbing movement,
    wherein at least some of the grooves that are thus worked out extend alongside each other in the form of similar groups of curves, parallel to each other and/or directly adjacent to each other or overlapping each other, in a through-flow direction or longitudinal direction of the ducts.

8. The cylinder head according to claim 7, wherein, in addition to the inner wall surfaces of the ducts, it is also the combustion chamber wall and/or the wall surfaces of valve guides fitted or pressed into the ducts and/or of valve seat rings fitted or pressed into the ducts that are machined with a cherry head guided in a stabbing movement, wherein at least some of the grooves that are worked out extend parallel to each other.

9. The cylinder head according to claim 7, wherein a depth of the grooves that are worked out measures 0.05 to 0.4 mm, and/or the mutual interval between the grooves measures 1 to 5 mm.

10. The cylinder head according to claim 7, wherein depressions having a spherical wall surface are milled into the inner wall surfaces of the ducts.

11. The cylinder head according to claim 7, wherein, in at least one intake duct, a valve guide is fitted whose duct-side end region is worked off or milled off flush with the wall surface of the duct.

12. The cylinder head according to claim 7, wherein, in at least one exhaust duct, a valve guide is fitted whose duct-side end region adjoins a combustion-chamber-side flow body which, on the combustion-chamber-side, is worked off or milled off flush with the inner wall surface and which is adjoined, in its lateral region and/or in its region directed away from the combustion chamber, by a flow body which protrudes into the exhaust duct and whose cross section decreases, in a manner promoting flow, toward the end region directed away from the combustion chamber and merges into the inner wall surface.

13. The method according to claim 1, which comprises milling with a five-axis CNC-controlled cherry head in a stabbing movement to form the grooves in the inner wall surfaces.

14. The method according to claim 2, wherein the walls of valve seat rings are pressed into the ducts and/or the outer wall surfaces of valve guides protruding into the ducts that are worked off completely, with the cherry head in the stabbing movement.

15. The method according to claim 4, wherein the curves extend in mutually parallel and/or directly adjacent or overlapping paths.

16. The method according to claim 5, wherein the grooves are worked to a depth of 0.1 to 0.15 mm, and/or are formed at mutual intervals of 1 to 3 mm.

17. The cylinder head according to claim 9, wherein the depth of the grooves measures 0.1 to 0.15 mm, and/or the mutual interval between the grooves measures 1 to 3 mm.

18. The cylinder head according to claim 10, wherein the depressions having a spherical wall surface are milled into the inner wall surfaces of the intake duct at predetermined and regular intervals from each other.

* * * * *